United States Patent [19]

Aignesberger et al.

[11] Patent Number: 4,657,593

[45] Date of Patent: Apr. 14, 1987

[54] MODIFYING SURFACE TENSION OF FINELY-DIVIDED MATERIALS IN A LIQUID

[75] Inventors: Alois Aignesberger, Trostberg; Johann Plank, Saal/Donau, both of Fed. Rep. of Germany

[73] Assignee: SKW Trostberg Aktiengesellschaft, Trostberg, Fed. Rep. of Germany

[21] Appl. No.: 755,224

[22] Filed: Jul. 15, 1985

Related U.S. Application Data

[63] Continuation of Ser. No. 439,253, Nov. 4, 1982, abandoned.

[30] Foreign Application Priority Data

Nov. 10, 1981 [DE] Fed. Rep. of Germany ....... 3144673

[51] Int. Cl.$^4$ .......................... B01J 13/00; C04B 7/02; C04B 24/22
[52] U.S. Cl. ......................................... 106/90; 44/51; 106/308 S; 252/312; 252/313.1; 252/353; 252/8.514; 252/8.554; 260/505 R; 260/513.7
[58] Field of Search ................. 252/313.1, 353, 8.5 A; 106/102, 308 S, 90; 260/513.7

[56] References Cited

U.S. PATENT DOCUMENTS

| | | | |
|---|---|---|---|
| 841,999 | 1/1907 | Müller et al. ..................... | 260/513.7 |
| 2,174,127 | 9/1939 | Henke et al. .................... | 252/353 X |
| 2,432,850 | 12/1947 | Albrecht ....................... | 260/513.7 X |
| 2,857,433 | 10/1958 | Bruson et al. .................. | 252/353 X |
| 3,149,152 | 9/1964 | Boehme ........................ | 260/513.7 X |
| 3,956,140 | 5/1976 | Nahm et al. .................... | 252/353 X |
| 4,406,702 | 9/1983 | Joseph ............................ | 252/353 X |

Primary Examiner—Richard D. Lovering
Attorney, Agent, or Firm—Felfe & Lynch

[57] ABSTRACT

The present invention provides acid group-containing, thermostable, hydrophilic condensation products of aldehydes and ketones, wherein the ketones used are symmetrical or asymmetrical ketones with acyclic aliphatic, araliphatic and/or aromatic radicals, at least one radical being non-aromatic.

The present invention also provides processes for the production of these condensation products, which can be used as thickening agents, retention agents, surface-active agents, dispersion agents and/or liquefying agents, especially in aqueous systems.

6 Claims, No Drawings

MODIFYING SURFACE TENSION OF FINELY-DIVIDED MATERIALS IN A LIQUID

This is a continuation of application Ser. No. 439,253 filed Nov. 4, 1982 (now abandoned).

The present invention is concerned with acid group-containing, thermostable, hydrophilic condensation products of aldehydes and ketones.

The condensation of ketones with aldehydes has been known for a long time. In its end stage, it leads to water-insoluble resins. The use of sodium sulphite as an alkaline catalyst, on the one hand, and as a substance introducing acid groups, on the other hand, makes it possible to obtain water-soluble condensation products which can be used, for example, as additives for inorganic binding agents for improving the properties thereof.

Thus, for example, Federal Republic of Germany Patent Specification No. 2,341,923 describes readily water-soluble condensation products of cycloalkanones and formaldehyde, obtained with the use of sodium sulphite as a substance introducing acid groups. However, one disadvantage of these condensation products is their low thermal stability. Thus, for example, in the case of concentrating a solution of cycloalkanone-formaldehyde condensation products, even under mild conditions (about 50° C.), substantially water-insoluble, powdery compounds are formed. Other sulphonic acid-modified formaldehyde condensation products, for example those based upon urea, also decompose at the boiling point of water. Therefore, these condensation products cannot be used at high temperatures such as occur, for example, in oil technology in the case of deep drilling.

Therefore, it is an object of the present invention to provide thermostable products which, even at high temperatures, are suitable, for example, as additives for improving the properties of aqueous systems.

Thus, according to the present invention, there are provided acid group-containing, thermostable, hydrophilic condensation products of aldehydes and ketones, wherein, as ketones, there are used symmetrical or asymmetrical ketones with acyclic aliphatic, araliphatic and/or aromatic radicals, at least one radical being non-aromatic.

The condensation products according to the present invention have a surprisingly high thermostability: in general, they are stable up to temperatures of at least 300° C. The thermostability is also retained in the presence of water.

As acid groups, the condensation products of the present invention preferably contain carboxyl, phosphono, sulphino and, in particular, sulpho groups and these groups can be attached via nitrogen or oxygen or via N-alkylene or O-alkylene bridges and can then be, for example, sulphamido, sulphooxy, sulphoalkoxy, sulphinoalkoxy or also phosphonooxy groups. An alkyl moiety in these radicals preferably contains up to 5 carbon atoms, methyl and ethyl being especially preferred. The condensation products according to the present invention can also contain two or more different acid groups.

The substituent R in the aldehydes used of the general formula R.CHO can be a hydrogen atom, an aromatic or non-aromatic (cyclic or acyclic) carbo- or heterocyclic radical or also an araliphatic radical, in which the number of carbon atoms or of carbon and heteroatoms is preferably up to 10. The aromatic radicals can be, for example, α- or β-naphthyl, phenyl or furfuryl; the araliphatic radicals can be, for example, benzyl or phenethyl; and the non-aromatic radicals can be, for example, cycloalkyl and especially alkyl radicals, preferably containing up to 6 carbon atoms, such as methyl, ethyl, propyl and butyl. The aliphatic radicals can also be branched or unsaturated and thus can be, for example, vinyl.

The aldehydes can also contain one or more substituents which do not impair the condensation reaction, for example, amino, hydroxyl, alkoxy or alkoxycarbonyl groups, and/or the acid groups present in the condensation products. It is also possible to use aldehydes which contain more than one aldehyde group, for example di- or trialdehydes, which, as a result of their increased reactivity, can be especially useful. In the case of, for example, the lower saturated aldehydes, such as formaldehyde or acetaldehyde, they can also be used in polymeric forms, for example paraformaldehyde or paraldehyde.

Examples of saturated aliphatic aldehydes which can be used include formaldehyde (or paraformaldehyde), acetaldehyde (or paraldehyde) and butyraldehyde; examples of substituted saturated aliphatic aldehydes include 3-methoxypropionaldehyde and acetaldol; examples of unsaturated aliphatic aldehydes include acrolein, crotonaldehyde, furfurol, 4-methoxyfurfurol and propargylaldehyde; and examples of dialdehydes include glyoxal and glutardialdehyde. Formaldehyde is especially preferred as aldehyde.

Ketones which are used accordingly to the present invention for the condensation products are symmetrical or asymmetrical ketones containing acyclic aliphatic, araliphatic and/or aromatic hydrocarbon radicals, at least one radical being non-aromatic. The hydrocarbon radicals preferably contain up to 10 carbon atoms.

Acyclic aliphatic radicals are straight-chained or branched, unsaturated or preferably saturated alkyl radicals, for example methyl, ethyl, propyl, butyl, isobutyl or nonyl radicals. Examples of araliphatic radicals include benzyl and phenethyl radicals and examples of aromatic radicals include α- and β-naphthyl and especially phenyl radicals.

The ketones can also contain one or more substituents which do not impair the condensation reaction, for example amino, hydroxyl, alkoxy or alkoxycarbonyl groups, and/or the acid groups contained in the condensation products.

Examples of saturated acyclic ketones include acetone, methyl ethyl ketone and methyl isobutyl ketone; examples of substituted saturated acyclic ketones include methoxyacetone, diacetone alcohol and ethyl acetoacetate; examples of unsaturated aliphatic ketones include methyl vinyl ketone, mesityl oxide and phorone; examples of araliphatic ketones include acetophenone, 4-methoxyacetophenone and 4-acetylbenzenesulphonic acid; and examples of diketones include diacetyl, acetylacetone and benzoylacetone.

The aldehydes and ketones can be used in pure form but also in the form of compounds with the substances introducing the acid groups, for example as aldehyde-sulphite adducts or as hydroxymethanesulphinic acid salts. Two or more different aldehydes and/or ketones can also be used.

The total number of carbon atoms or possibly of carbon atoms and heteroatoms in the aldehydes and ketones used according to the present invention is so chosen that the hydrophilic character of the condensation products is maintained. Therefore, it is also dependent upon the number of acid groups in the condensation product, as well as upon the ratio of ketone/aldehyde. The preferred total number is up to 11 for the aldehydes and from 3 to 12 for the ketones.

In general, the mole ratio of ketones/aldehydes/acid groups is 1/1 to 6/0.02 to 2 but variations can be made depending upon the special field of intended use.

Because of their properties, the condensation products according to the present invention can be used as thickening agents, dispersing agents, surface-active agents (tensides) and retention agents, but also as liquefying agents, especially for aqueous systems. The desired properties can thereby be regulated by suitable choice of the starting materials and of the mole ratios. As examples for aqueous systems, in which the products according to the present invention can be advantageously used, there may be mentioned inorganic binding agent suspensions and solutions, pigment and dyestuff dispersions, dispersion agents for oil-in-water emulsions, aqueous kaolin and clay suspensions and oil-water-coal suspensions. As a result of their high thermostability, the condensation products according to the present invention are especially well suited as additives for inorganic binding agents. The products according to the present invention are so stable that they can be ground with clinker in a cement mill without loss of activity. As dispersion agents, they can be used, for example, for the production of flowing concrete or tile-adhesive materials and, due to their good thermostability, especially also for the liquefaction of deep drilling cement mixtures, for which purpose a high temperature stability is necessary because of the high temperatures which arise. The surface-active agents according to the present invention lower the surface tension of aqueous solutions and can be used, for example, as foaming additives for the production of aeroconcrete. They can also be used as air entraining agents for mortar and concrete. Another possible use is for the mobilising of residual oil by tenside or micellar flooding in the case of enhanced oil recovery. As retention agents, they can be used for the production of slurries of hydraulic binding agents which have good water retention properties, for example in the case of deep drilling cement slurries or in the case of liquid adhesives, and as thickening agents, they can be very well used, for example, in oil technology for increasing the viscosity of aqueous solutions and suspensions.

The condensation products are preferably used in the form of solutions or dispersions and especially of aqueous solutions or dispersions. The solids content of these compositions is generally 10 to 70 and especially 20 to 50% by weight.

It is also possible to use two or more condensation products according to the present invention with the same, similar and/or also different effectiveness or mixtures thereof with one or more known additives with the same, similar and/or different effectiveness, for example mixtures with known dispersing agents, tensides or concrete additives. In this way, the properties of the end products can often be additionally changed or differentiated.

The predominating properties of the condensation products according to the present invention depend especially upon the nature and the mole ratio of aldehydes/ketones/acid group-introducing compounds. The hydrophilic character decreasing with a decreasing proportion of acid groups and, as a rule, at a value of <0.15 mole, complete water solubility can no longer be achieved. For dispersing agents and liquefiers, there are preferably used formaldehyde, glyoxal and acetone and a ratio of ketone/aldehyde/acid group-introducing compounds of 1/1 to 6/0.25 to 2. *Retention and thickening agents are obtained from aldehydes and ketones with alkyl radicals containing up to 3 carbon atoms and a mole ratio of ketone/aldehyde/acid group-introducing compound of 1/1 to 6/0.2 to 2. By a combination of the conditions preferably employed for the specific properties, for example by combination of the nature of the starting materials especially suitable for a particular property with the mole ratio preferred for another nature, mixed properties can also be achieved. Therefore, the present invention is also concerned with the use of the agents according to the present invention as thickening agents, retention agents, surface-active agents, dispersing agents and/or liquefying agents and especially as additives for aqueous systems.

*Surface-active agents are preferably obtained by reaction of aldehydes and ketones with longer alkyl or aralkyl radicals containing at least more than one carbon atom and a mole ratio of ketone/aldehyde/acid group-introducing compounds of 1/1 to 6/0.02 to 2.

The condensation products according to the present invention can be obtained by reacting the ketones, aldehydes and acid group-introducing compounds under alkaline pH conditions, using a kind of one-pot reaction. As embodiments for the production of the condensation products, the following variants are possible:

I. Adding the aldehyde to the ketone and the acid group-introducing compound;
II. Adding the ketone to the aldehyde and the acid group-introducing compound;
III. Adding a mixture of aldehyde and acid group-introducing compound or (for example in the case of sulphite) a compound of the aldehyde with the acid group-introducing compound to the ketone;
IV. Adding a mixture of ketone and acid group-introducing compound or a compound of the ketone with the acid group-introducing compound to the aldehyde; or
V. Simultaneous presence of aldehyde, ketone and acid group-introducing compound.

In the case of Variants I to V, instead of the ketone there can, in each case, also be used a ketone-aldehyde condensation product which contains some or all of the necessary amount of ketone and/or aldehyde.

Generally speaking, process Variant I is preferred. Process Variant V is especially suitable for the reaction of less reactive components.

In general, the reaction commences even in the case of gentle heating and then proceeds exothermally so that, as a rule, cooling is carried out. For the achievement of a uniform product or especially when using less reactive starting materials, a post-heating is desirable, which can last for several hours.

The reaction is generally carried out at a pH value of 8 to 14, the range of from 11 to 13 being preferred. The pH value can be adjusted, for example, by the addition of hydroxides of mono- or divalent cations or by the presence of an acid group-introducing material, for example sodium sulphite, which is hydrolysed in aqueous solution with an alkaline reaction.

The reaction can be carried out not only in homogeneous but also in heterogenous phase. As a rule, the reaction medium is water or an aqueous mixture, the proportion of water preferably being at least 50% by weight. The non-aqueous solvent additives are preferably polar organic solvents, for example alcohols or acid esters. The reaction can be carried out not only in an open vessel but also in an autoclave, in which case it can be desirable to work in an inert gas atmosphere, for example under nitrogen.

If desired, the condensation products can be isolated from solutions or dispersions containing them after the reaction, for example by evaporation in a rotary evaporator or by spray drying. However, the solutions or dispersions obtained can also be used directly as such.

As aldehyde and ketone starting materials, there are used the above-mentioned aldehydes and ketones and mixtures of ketones and/or of aldehydes can also be used. The aldehydes and ketones can be used not only in pure form but also as compounds with the acid group-introducing material, for example as bisulphite addition compound. They can be present or added not only in aqueous but also in non-aqueous, for example alcoholic, solution.

Furthermore, to part of the ketone, which is mixed with or has already been reacted with the acid group-introducing compound, there can first be added the remaining amount of the ketone, as well as part of the aldehyde and finally the remaining amount of the aldehyde is added.

This method of production can also be used when exchanging the aldehyde and the ketone. It is especially suitable for carrying out the process continuously.

In the case of aldehydes and ketones with a lower alkyl chain, the reaction proceeds especially quickly and exothermally, whereas in the case of compounds with sterically-demanding substituents, for example methyl isobutyl ketone or benzylacetone, a long thermal after-treatment is necessary to complete the reaction.

As acid group-introducing compounds, there can be used all compounds introducing the acid groups under the condensation reaction conditions used, for example the pure acids, salts of the acids with mono- to trivalent inorganic or organic cations or addition compounds and especially addition compounds with the aldehydes and ketones used according to the present invention. Examples thereof include sulphites, hydrogen sulphites, pyrosulphites, bisulphite addition compounds of aldehydes and ketones, amidosulphonic acid salts, taurine salts, sulphanilic acid salts, hydroxymethanesulphinic acid salts, aminoacetic acid salts and phosphorus acid salts.

The condensation products according to the present invention contain, in addition to the acid groups, hydroxyl groups, keto groups and possibly double bonds. This clearly follows from their IR spectra which display all the bands characteristic for these groups.

The following Examples are given for the purpose of illustrating the present invention. If not stated otherwise, parts and percentages are parts by weight and percentages by weight.

The following Table I summarises the starting materials and the methods of production employed in the specific Examples:

TABLE I

| Example | Starting materials ketone | aldehyde | acid group-introducing substance | mole ratio of ketone: aldehyde: acid group-i.s. | method of production |
|---|---|---|---|---|---|
| A.1 | Acetone | Formaldehyde | sulphite | 1:3:0.5 | Variant I |
| A.2 | Acetone | Formaldehyde | sulphite | 1:1.67:0.67 | Variant I |
| A.3 | Acetone | Formaldehyde | sulphite | 1:1:0.05 | Variant I |
| A.4 | Acetone | Formaldehyde | amidosulphonic acid | 1:3:0.5 | Variant I |
| A.5 | Acetone | Formaldehyde | aminoacetic acid | 1:3:1 | Variant I |
| A.6 | Acetone | Formaldehyde | oxymethanesulphinic acid | 1:2:1 | Variant III |
| A.7 | Acetone | Acetaldehyde | sulphite | 1:2:0.5 | Variant I |
| A.8 | — | Crotonaldehyde | acetone bisulphite adduct | 1:2:1 | Variant IV |
| A.9 | Acetone | Crotonaldehyde/furfurol | sulphite | 1:2:0.5 | Variant I |
| A.10 | Acetone | Glyoxal | taurine | 1:1.5:0.5 | Variant I |
| A.11 | Methyl ethyl ketone | Formaldehyde | sulphite | 1:2:0.75 | Variant I |
| A.12 | Methyl iso-butyl ketone | Formaldehyde | sulphite | 1:2:0.35 | Variant V |
| A.13 | Diacetone alcohol | Crotonaldehyde | pyrosulphite | 1:6:0.5 | Variant I |
| A.14 | Mesityl oxide | Formaldehyde | sulphite | 1:4:1.3 | Variant I |
| A.15 | Acetophenone | Paraformaldehyde | sulphite | 1:3:1 | Variant II |
| A.16 | 4-Acetylbenzene sulphonic acid | Crotonaldehyde | sulphite | 1:2:0.5 | Variant I |
| A.17 | Acetylacetone | Acrolein | sulphite | 1:3:2 | Variant I |
| A.18 | Acetone | Formaldehyde | sulphite | 1:3:0.5 | Variant I |
| A.19 | Methyl ethyl ketone | Crotonaldehyde | aminoacetic acid | 1:3:1 | Variant I |
| A.20 | Diacetone alcohol | Formaldehyde | sulphite | 1:3:0.5 | Variant I |

A. Preparation of the condensation products

Example A1

Into an open reaction vessel equipped with a stirrer, an internal thermometer and a reflux condenser, there are successively introduced 1000 parts by weight of water, 630 parts by weight of sodium sulphite as well as 580 parts by weight of acetone, followed by intensive stirring for a few minutes. A considerable amount of the sulphite thereby dissolves and the temperature of the reaction mixture increases to 31° to 32° C.

The batch is heated to an internal temperature of 56° C. (acetone reflux) and a total of 3000 parts by weight of 30% formaldehyde solution (formalin) added dropwise thereto. Because of the extremely exothermic reaction, the addition of the formalin is carried out in such a manner that the first tenth of the formaldehyde solution is added slowly and uniformly and the commencement of the reaction then awaited, which manifests itself by the commencement of a yellow coloration of the batch and an increased acetone reflux.

As soon as the first signs of a reaction are visible, cooling is commenced. The reaction continues with a red coloration of the batch and vigorous acetone reflux.

After this initial phase has subsided, the remainder of the formalin is run in, the temperature being maintained at 60° to 70° C. by cooling. When the dropwise addition of the aldehyde is finished, the reaction mixture is heated to 90° to 95° C. and maintained at this temperature for 1 hour.

The cooled solution of the condensation product has a solids content of 34.5% and a viscosity of 25 cP at 20° C.

The product reduces the viscosity of aqueous dispersions and can be used, for example, for the liquefaction of deep drilling cement slurries.

Example A2

The reaction vessel of Example A1 is supplied with 1260 parts by weight of sodium sulphite, as well as 870 parts by weight of acetone and heated to an internal temperature of 56° C., while stirring vigorously.

As soon as this internal temperature has been reached, the addition of a total of 2500 parts by weight of 30% formaldehyde solution is commenced, the exothermic reaction being initiated in the manner described in Example A1. When the reaction is under way, the remainder of the formalin is added from a supply vessel, the temperature of the solution being allowed to increase to 80° C. during the addition of the last third of the formalin. The deep red, initially low viscosity solution thereby assumes a viscosity of 3000 cP (80° C.). When the addition of the formalin is finished, the reaction mixture is further heated to 90° C. for 30 minutes and the final condensation product preferably removed from the reaction vessel while still hot.

The solution of the condensation product is non-pourable (viscosity > 1000P) at ambient temperature and has a solids content of 56.0%. An aqueous solution of the condensate has a strongly alkaline reaction (pH=13.5).

The product imparts a good water retention to cement mortars and can be used, for example, for sticking tiles.

Example A3

2000 Parts by weight of water, 63 parts by weight of sodium sulphite and 580 parts by weight of acetone are intensively stirred in the reaction vessel of Example A1 and heated to an internal temperature of 56° C.

As soon as the desired temperature is reached and the acetone begins to reflux, a total of 1000 parts by weight of 30% formaldehyde solution (formalin) are added thereto, the exothermal reaction being initiated and carried out in the manner described in Example A1 by the initial addition of 100 parts by weight of formalin. When the formalin addition is finished, the brick-red, strongly foaming solution is further heated to 90° to 95° C. for 1 hour.

The cooled solution of the condensation product has a solids content of 24.0% and a viscosity of 10 cP (20° C.).

The product has a good tenside action and can be used, for example, for producing aeroconcrete.

Example A4

In the apparatus used in Example A1, 970 parts by weight of amidosulphonic acid are first dissolved in 6000 parts by weight of water and neutralised with 370 parts by weight of calcium hydroxide. The solution of calcium amidosulphonate has a very strongly acidic reaction and is rendered alkaline by the addition of a further 100 parts by weight of calcium hydroxide.

To this acid group-introducing material there are added 1160 parts by weight of acetone, followed by heating to 56° C., whereafter a total of 6000 parts by weight of 30% formaldehyde solution are added in the manner described in Example A1. Subsequently, the orange-red solution, which still contains excess calcium hydroxide suspended therein, is condensed for 24 hours at 90° C.

The cooled solution of the condensation product has a solids content of 25% and a viscosity of 15 cP (20° C.) and has an alkaline reaction.

The product can be used as a dispersion agent, for example for hydraulic binding agents.

Example A5

The reaction vessel of Example A1 is supplied successively, in the given order, with 2000 parts by weight of water, 750 parts by weight of aminoacetic acid, 400 parts by weight of sodium hydroxide and 580 parts by weight of acetone and heated to an internal temperature of 56° C., while stirring vigorously.

As soon as the desired temperature is reached, a total of 2430 parts by weight of 37% formalin, which is stabilised with 0.01% isophthalobisguanamine, is allowed to run in, in the manner described in Example A1, into the reaction mixture maintained at 60° to 80° C., followed by heating to 90° to 95° C. for 24 hours.

The brick-red solution of the condensation product has a greenish fluorescence and has a solids content of 38%. Its viscosity at 20° C. is 25 cP.

The condensate possesses dispersing properties and lowers, for example, the viscosity of deep drilling cement slurries.

Example A6

In the open reaction vessel of Example A1, 1000 parts by weight of water and 580 parts by weight of acetone are heated to 56° C. while stirring vigorously and adjusted at this temperature to a pH value of at least 13.0 with 38 parts by weight of solid sodium hydroxide.

Subsequently, a clear solution of 1180 parts by weight of sodium formaldehyde sulphoxylate sodium salt of oxymethanesulphinic acid), 1627 parts by weight of 37% formalin (stabilised with 10% methanol) and 3000 parts by weight of water are allowed to run into the reaction mixture as in Example A1 and the reaction carried out as therein described. After finishing the formalin addition, the deep red solution is heated for 5 hours to 90° to 95° C.

The low viscosity solution of the condensation product has a solids content of 28% and has a strongly alkaline reaction.

The condensate has dispersing and tenside properties.

Example A7

5000 Parts by weight of water, 1260 parts by weight of sodium sulphite and 1160 parts by weight of acetone are vigorously stirred in the reaction vessel of Example A1 and heated to 56° C.

A total of 1760 parts by weight of pure acetaldehyde are allowed to run in as in Example A1 and, when the aldehyde addition is completed, the reaction mixture is kept at 90° to 95° C. for 4 hours.

The orange-brown condensate has a solids content of 40% and has a viscosity of 450 cP at 20° C.

The condensation product has a surface activity and considerably lowers, for example, the surface tension of aqueous solutions.

Example A8

537 Parts by weight of acetone-sodium bisulphite adduct are first stirred into 1000 parts by weight of water and the colourless, clear solution adjusted to a pH of 13 with 160 parts by weight of solid sodium hydroxide.

Subsequently, the reaction vessel of Example A1 is supplied with 1000 parts by weight of water and 464 parts by weight of crotonaldehyde, heated to 60° C. and the above prepared alkaline solution of the acetone-bisulphite adduct added dropwise thereto in the manner described in Example A1. Subsequent to the addition, the batch is kept at 90° to 95° C. for 3 hours.

The red-brown, low viscosity solution of the condensation product has a solids content of 30% and has a strongly alkaline reaction.

The product has surface-active properties and can be used, for example, for the production of aeroconcrete.

Example A9

Into the reaction vessel of Example A1 there are successively placed 6000 parts by weight of water, 630 parts by weight of sodium sulphite and 580 parts by weight of acetone and the mixture heated to 56° C. with vigorous stirring.

When the reaction mixture has reached this temperature, a mixture of, in all, 960 parts by weight of furfurol and 700 parts by weight of crotonaldehyde are allowed to run into the reaction mixture in the manner described in Example A1. When the addition is finished, the reaction mixture is heated to 90° to 95° C. for 4 hours.

The deep red solution of the condensation product has a solids content of 27% and a viscosity of 180 cP at 20° C.

The condensate can be used as a dispersion agent with surface-active properties.

Example A10

The reaction vessel of Example A1 is successively supplied with 2000 parts by weight of water, 625 parts by weight of taurine, 200 parts by weight of solid sodium hydroxide and 580 parts by weight of acetone and the reaction mixture is heated to 56° C. (acetone reflux).

As soon as this internal temperature is reached, the addition of a total of 2900 parts by weight of 30% glyoxal solution is commenced. The reaction, which takes place with the evolution of much heat, is carried out in the manner described in Example A1. When the glyoxal addition is finished, the reaction mixture is heated to 90° to 95° C. for 2 hours.

The dark red, low viscosity solution has a solids content of 35% and has a weakly alkaline reaction.

The condensation product is a good dispersion agent.

Example A11

Into a pressure vessel made of V2A steel and equipped with a bladed stirrer, an internal thermometer and a pressure indicator, there are placed 1500 parts by weight of water, 1890 parts by weight of sodium sulphite and 1440 parts by weight of methyl ethyl ketone and, after closing the reaction vessel, the mixture is vigorously stirred.

The contents of the vessel are now heated to an internal temperature of 70° C. and a total of 4000 parts by weight of 30% formaldehyde solution are introduced into the pressure vessel via a measuring pump attached to an autoclave inlet, the temperature of the reaction mixture thereby being allowed to increase to a maximum of 85° C. and the maximum overpressure being 2 bar. When the addition of the formalin is finished, the solution is heated to 90° to 100° C. for 1 hour.

The orange-red, strongly foaming solution has a solids content of 48% and a viscosity of 1200 cP.

The condensation product is surface-active and can be used, for example, as an air-entraining agent for mortar and concrete.

Example A12

Into the reaction vessel of Example A1 there are successively introduced 1000 parts by weight of water, 126 parts by weight of sodium sulphite, 1000 parts by weight of methyl isobutyl ketone and 600 parts by weight of 30% formaldehyde solution and the two-phase mixture is heated to 80° C. for 8 hours. The reaction takes place with the visible decrease of the organic phase as a result of the condensation of the methyl isobutyl ketone and with the formation of a yellow coloration of the aqueous phase.

When the reaction is finished, the uppermost organic layer, which consists of about 70% of non-condensed methyl isobutyl ketone used, is separated off from the aqueous phase. The ketone thus obtained can be re-used for further batches.

The aqueous, yellow-coloured solution of the condensation product has a solids content of 14% and has a strongly alkaline reaction. The viscosity of the solution of 20° C. is 12 cP.

Because of its surface-active properties, the product can be used, for example, for the introduction of air pores into mortar or concrete.

Example A13

Into the reaction vessel of Example A1 there are successively introduced 6000 parts by weight of water, 475 parts by weight of sodium pyrosulphite and 580 parts by weight of diacetone alcohol and the mixture heated to an internal temperature of 70° C. As soon as the clear, colourless solution has reached this temperature, 257 parts by weight of solid sodium hydroxide are added thereto.

Into this reaction mixture there are run in, in all, 2100 parts by weight of crotonaldehyde in the manner described in Example A1 and, after completion of the aldehyde addition, the temperature is kept at 90° C. for 30 minutes.

The deep red solution of the condensation product has a solids content of 36% and has a strongly alkaline reaction. Its viscosity at 20° C. is 150 cP.

The product has very good tenside properties.

Example A14

200 Parts by weight of water, 980 parts by weight of mesityl oxide and 1638 parts by weight of sodium sulphite are vigorously stirred in the reaction vessel of Example A1 and heated to 90° C.

To the suspension there are added, in all, 4000 parts by weight of 30% formaldehyde solution in the manner described in Example A1 and the dark red, highly viscous solution obtained is heated to 90° to 95° C. for 1 hour.

There is obtained a condensation product which is almost solid at ambient temperature but which is water-soluble, has a solids content of 50% and has a strongly alkaline reaction (pH 13.5).

The product increases the viscosity of aqueous solutions and can be used, for example, as a thickening agent for cement slurries.

Example A15

A colourless solution of 900 parts by weight of paraformaldehyde and 1260 parts by weight of sodium sulphite in 3000 parts by weight of water is placed in the open reaction vessel of Example A1 and mixed slowly and uniformly at 60° C., with vigorous stirring, with a total of 1200 parts by weight of acetophenone, the temperature of the reaction mixture not being allowed to exceed 70° C. When the addition of the ketone is finished, the strongly foaming solution is heated to 90° to 95° C. for 2 hours.

The yellow coloured, low viscosity solution has a solids content of 49% and has a strongly alkaline reaction. Its viscosity at 20° C. is 40 cP.

The condensate has surface-active properties and can be used, for example, as a foamer additive in the production of aerated concrete.

Example A16

A solution of 555 parts by weight of sodium 4-acetylbenzene-sulphonate and 158 parts by weight of sodium sulphite in 2000 parts by weight of water is heated to 80° C. in the reaction vessel of Example A1 and mixed with 23 parts by weight of solid sodium hydroxide.

Into this strongly alkaline-reacting mixture there is run in, in the manner described in Example A1, a total of 350 parts by weight of crotonaldehyde in the temperature range of from 60° to 70° C., whereafter the reaction mixture is kept at 95° C. for 6 hours.

The deep red solution of the condensation product has a solids content of 33% and has a strongly alkaline reaction. The viscosity at 20° C. is 12 cP.

The product has tenside properties and lowers the surface tension of aqueous solutions.

Example A17

A vigorously stirred mixture of 1000 parts by weight of acetylacetone, 2520 parts by weight of sodium sulphite and 7000 parts by weight of water is heated to an internal temperature of 60° C. in the reaction vessel of Example A1 and then mixed with a total of 1680 parts by weight of acrolein by the process described therein. Subsequently, the reaction mixture is heated to 90° to 95° C. for 4 hours.

The deep red condensate has a solids content of 40% and has a viscosity of 24 cP at 20° C.

The product forms a considerable foam in aqueous solution and can be used, for example, as a foamer additive in the production of aeroconcrete.

Example A18

In a stirrer vessel provided with a storage vessel and a condenser, 1000 parts by weight of 30% formalin and 580 parts by weight of acetone are vigorously stirred with 100 parts by weight of potassium carbonate, the temperature of the batch not being allowed to exceed 55° C.

After 12 hours, the acetone-formaldehyde condensate obtained is mixed with 1700 parts by weight of water and 630 parts by weight of sodium sulphite, then heated to 60° C. and a further 2000 parts by weight of 30% formalin added thereto, the temperature of the reaction mixture thereby being increased to 90° C. Subsequently, the reaction mixture is heated to 95° C. for 1 hour.

The solution obtained of the condensation product has a solids content of 30% and can be used, for example, as a liquefying additive for aqueous β-hemihydrate gypsum slurry.

Example A19

In the reaction vessel of Example A18, 6400 parts by weight of water, 1400 parts by weight of crotonaldehyde and 720 parts by weight of methyl ethyl ketone are mixed, with vigorous stirring, with 100 parts by weight of potassium carbonate and maintained for 5 hours at a temperature of 80° to 90° C.

Subsequently, a solution of 970 parts by weight of sodium aminoacetate in 800 parts by weight of water is added thereto, heated to 80° C. and a further 700 parts by weight of crotonaldehyde added thereto, the temperature of the reaction mixture thereby slowly increasing to 90° C. The reaction mixture is finally heated for 2 hours at this temperature.

The solution obtained of the condensation product is deep red coloured and has a solids content of 36%. It has surface-active properties.

Example A20

1400 Parts by weight of water, 1400 parts by weight of 30% formalin solution and 1160 parts by weight of diacetone alcohol are, after the addition of 100 parts by weight of potassium carbonate, vigorously stirred in the reaction vessel of Example A18 for 8 hours at 30° C.

The yellow coloured diacetone alcohol-formaldehyde condensate is mixed with 630 parts by weight of sodium sulphite, the reaction mixture is heated to 60° C. and a further 1600 parts by weight of 30% formalin solution are added thereto, the temperature of the solution thereby reaching 90° C. In the course of subsequent heating at 90° C. for 1 hour, the viscosity of the resin solution increases so that, 30 minutes after the end of the introduction of the formalin, a further 1500 parts by weight of water must be added in order to maintain the stirrability of the reaction mixture.

The deep red coloured condensation product has a solids content of 32% and solidifies upon cooling to ambient temperature. The viscosity of a 10% dilution of this solution is 55 cP.

The product acts as a retention agent and reduces, for example, the water loss of deep drilling cement slurries to porous formations.

B. Examples of use

Example B1

Liquefaction of deep drilling cement slurries

A condensation product produced according to Examples A1, A5, A10 or A18 lowers the viscosity of deep drilling cement slurries which are produced according to the Standard conditions of API RP 10B and are measured with a Fann viscometer.

Example B2

Dispersion of Portland cement and β-hemihydrate gypsum

The dispersion action of condensation products according to the present invention on Portland cement of class 45F, as well as on β-hemihydrate gypsum, is shown in the following Table II:

TABLE II

Increase of the extent of spreading of aqueous Portland cement and β-hemihydrate gypsum slurries in the case of the addition of condensation products of the present invention

| condensation product of | Preparation Example | Increase of the extent of spreading of Portland cement slurries+ | Increase of the extent of spreading of β-hemihydrate gypsum slurries++ |
|---|---|---|---|
| Acetone/formaldehyde/sulphite | A.1 | 58% | 52% |
| Acetone/formaldehyde/sulphite | A.2 | 33% | 40% |
| Acetone/formaldehyde/aminoacetic acid | A.5 | 49% | 47% |
| Acetone/glyoxal/taurine | A.10 | 54% | 49% |
| Methyl ethyl ketone/formaldehyde/sulphite | A.11 | 42% | 43% |
| Acetone/formaldehyde/sulphite | A.18 | 53% | 49% |

+ amount of condensation product in each case 0.2% of solids, referred to cement content
++ amount of condensation product in all cases 0.8% of solids, referred to gypsum content.

Example B3
Liquefying action of heat-treated condensation products on deep drilling cement The following Table III shows the change of the extent of spreading of an aqueous deep drilling cement slurry in the case of the addition of condensation products treated in the following manner:
(a) solution of the condensation product according to the Example of preparation without additional heat treatment;
(b) 20% aqueous solution of the condensate autoclaved at the given temperatures for 5 hours;
(c) powdery condensation product after storage for 15 hours at the given temperatures.

TABLE III

Liquefying action of heat-treated condensation products on deep drilling cement slurries

| | | change of spreading out of the deep drilling cement slurries+ | | | | |
|---|---|---|---|---|---|---|
| | | (a) condensate solution according to production Example | (b) condensate solution 5 h. heat treated at | | (c) powdered substance 15 h. heat treated at | |
| Condensation product of | Production Example | | 105° C. | 250° C. | 105° C. | 250° C. |
| Acetone/formaldehyde/ sulphite | A1 | +43% | +43% | +42% | +43% | +43% |
| Acetone/formaldehyde/ aminoacetic acid | A5 | +30% | +30% | +30% | +30% | +30% |
| Acetone/glyoxal/ taurine | A10 | +41% | +41% | +40% | +41% | +40% |

+production of the slurry according to API RP 10B from class G cement; amount of condensation product in each case 0.2% solids, referred to cement content.

Example B4
Production of flowing concrete with the addition of dispersed condensation products Condensation products produced according to Examples A1, A5, A10 and A18 are suitable for the production of flowing concrete according to the instructions of "Directions for the production and working up of flowing concrete" in the edition of May, 1974, as are cited, for example, in the periodical "Beton", 24, 342-344/1974.

Example B5
Surface activity of condensation products

From pulverised condensation products, each of which had been stored for 15 hours at 105° C. or 200° C., there were produced 2% aqueous solutions, the surface tensions of which were measured tensiometrically. The measurement results are summarised in the following Table IV:

TABLE IV

Surface tension of 2% aqueous solutions of heat-treated condensation products

| | | surface tension (dyn/cm) | |
|---|---|---|---|
| condensation product of | production Example | powder at 105° C. | powder at 200° C. |
| acetone/acetaldehyde/ sulphite | A7 | 36.2 | 36.4 |
| methyl ethyl ketone/ formaldehyde/sulphite | A11 | 38.0 | 38.0 |
| methyl isobutyl ketone/ formaldehyde/sulphite | A12 | 33.0 | 33.0 |
| diacetone alcohol/ crotonaldehyde/ pyrosulphite | A13 | 38.8 | 39.0 |
| acetylacetone/ acrolein/sulphite | A17 | 41.2 | 41.1 |

Example B6
Production of aeroconcrete with surface-active condensation products A 1% solution of the solid condensate of production Example A7 was foamed by means of a commercially-available foam aggregate to give a foam with an average density of 0.1 g/cm³ and stirred into a mixture of 300 kg. of Portland cement 45F, 600 kg. of fine sand (particle size 0 to 1 mm.) and 120 kg. of water. The aeroconcrete so produced had a fresh green density of 0.99 g./cm³.

Example B7
Aeroconcrete adhesives with mortar or cement glue in the case of the addition of retention agents Condensation products produced according to Examples A2 and A14 can be used for the production of mortars or cement glues with high water retention, such as are used for aeroconcrete adhesions.

The aeroconcrete is so securely adhered by the cement glue that, after 24 hours, breakage no longer takes place at the joint.

The same result is achieved with solid condensation products which have been heat treated for 15 hours at 200° C. and subsequently added to the cement glue as retention agent.

Example B8
Thickening of cement slurries with addition of condensation products Condensation products produced according to Examples A2, A14 and A20 increase the viscosity of aqueous solutions or of aqueous suspensions of inorganic binding agents, for example deep drilling and Portland cement or gypsum.

What is claimed is:
1. A method of modifying the surface tension of a mixture of finely divided materials in a liquid comprising adding, to the mixture, an acid group-containing, thermostable, hydrophilic condensation product of
an aldehyde having up to 11 carbon atoms and the formula R-CHO wherein R is hydrogen or an aromatic or non-aromatic cyclic or acyclic carbo- or hetero-radical or araliphatic radical with a total of up to 10 combined carbon and hetero-atoms in each; and
a ketone having 3 to 12 carbon atoms and the formula $R_1$—(CO)—$R_2$ wherein $R_1$ and $R_2$ are individually selected from the group consisting of acyclic aliphatic, araliphatic and aromatic hydrocarbon radicals of up to 10 carbon atoms and with the proviso that at least one of $R_1$ and $R_2$ must be non-aromatic; and
as acid group-containing compound, a compound containing, as acid groups, carboxyl, phosphono, sulphino and sulpho, sulphamido, sulphooxy, sulphalkoxy, sulphinoalkoxy and/or phosphonoxy, wherein alkyl groups contain up to 5 carbon atoms; and wherein the mole ratio of ketone/aldehyde/acid group is 1/1:6/0.02:2, and the condensation is an aldol reaction accomplished at a pH of 8 to 14 in aqueous medium.

2. The method of claim 1 wherein
R in the aldehyde is alpha- or beta-naphthyl, phenyl, furfuryl, benzyl, phenethyl, cycloalkyl with up to 6 carbons, alkyl with up to 6 carbons, vinyl, paraformaldehyde or paraldehyde.

3. The method of claim 1 wherein the aldehyde is a di- or trialdehyde.

4. The method of claim 1 wherein an inorganic binding agent, a pigment, a dyestuff, oil, kaolin, clay or an oil and coal mixture are dispersed in an aqueous medium.

5. The method of claim 1 wherein portland cement is dispersed in water using a condensation product of acetone and formaldehyde or glyoxal.

6. The method of claim 1 wherein
the aldehyde is formaldehyde, paraformaldehyde, acetaldehyde, paraldehyde, butyraldehyde, 3-methoxypropionaldehyde, acetaldol, acrolein, crotonaldehyde, furfurol, 4-methoxyfurfurol, propargylaldehyde, glyoxal and glutardialdehyde, and
the ketone is acetone, methyl ethyl ketone, methyl isobutyl ketone, methoxyacetone, diacetone alcohol, ethyl acetoacetate, methyl vinyl ketone, mesityl oxide, phorone, acetophenone, 4-methoxyacetophenone, 4-acetylbenzene-sulphonic acid, diacetyl, acetylacetone and benzoylacetone.

* * * * *